Dec. 2, 1958     W. VOIGT     2,862,231
METHOD AND APPARATUS FOR DIVIDING THERMOPLASTIC BODIES
Filed March 7, 1956

Inventor:
Wilfried Voight
By:
Michael S. Struker
agt

United States Patent Office 2,862,231
Patented Dec. 2, 1958

2,862,231

METHOD AND APPARATUS FOR DIVIDING THERMOPLASTIC BODIES

Wilfried Voigt, Wiesbaden-Biebrich, Germany, assignor to Lonza-Werke Elektrochemisch Fabriken G. m. b. H., Baden, Germany Application March 7, 1956, Serial No. 570,032

Claims priority, application Switzerland March 10, 1955

15 Claims. (Cl. 18—1)

The present invention relates to a method and apparatus of dividing thermoplastic bodies, and more particularly it relates to a method and apparatus for dividing foils, sheets, pipes and the like made of thermoplastic resins.

It is well known to divide foils, sheets, plates and the like made of thermoplastic resins by cutting the same with a wedge-shaped tool. By using knives, scissors or the like for cutting bodies made of thermoplastic resins it is unavoidable to form separation surfaces in the thermoplastic body which are rough, uneven and which might also show groove-like indentations. By using saw-like dividing tools it is also not possible to obtain absolutely plane, smooth and polished separation surfaces because the saw teeth pluck small portions of the material from the separation surfaces. Furthermore, the wear of the tools, especially saws, is considerable, and frequent sharpening and replacement is required.

It is therefore an object of the present invention to overcome the aforementioned difficulties in dividing thermoplastic bodies.

It is another object of the present invention to provide a method and apparatus for dividing thermoplastic bodies which will achieve absolutely smooth, polished separation surfaces.

It is a further object of the present invention to provide a method and apparatus for dividing thermoplastic bodies which can be easily and economically performed.

It is yet another object of the present invention to provide a method and apparatus for dividing thermoplastic bodies whereby wear and tear is reduced to a minimum.

Other objects and advantages of the present invention will become apparent from a further reading of the description and the appended claims.

With the above objects in view, the present invention mainly consists in a method of dividing thermoplastic resin bodies, comprising the steps of rapidly rubbing a thermoplastic resin body at a limited, localized portion thereof until the portion of said thermoplastic resin body melts due to the frictional heat caused by the rubbing, and progressively rubbing portions of the thermoplastic resin body next to previously melted portions thereof until the progressively rubbed portions are melted, whereby the thermoplastic resin body may be separated into two parts when the same is melted throughout the thickness and length thereof.

The present invention also contemplates in a device for dividing thermoplastic bodies in combination support means, a shaft rotatably mounted on the support means, a thin disc of predetermined diameter fixedly centrally mounted on the shaft and extending perpendicularly to the axis thereof so as to rotate with the same, supporting discs fixedly mounted on the shaft on opposite sides of the thin disc and supporting the same, the supporting discs having diameters smaller than the predetermined diameter of the thin disc, a support arranged parallel to the shaft and at a distance from the axis thereof slightly smaller than the radius of said thin disc, the support being formed with a notch in which the circular edge of the thin disc is adapted to rotate.

According to the present invention, thermoplastic bodies such as foils, sheets, plates, pipes and the like, are divided by melting-off a very thin layer of the thermoplastic material along the dividing plane. While the method of the present invention is not limited to any specific shape or thickness of the thermoplastic bodies, it has been found that especially advantageous results are obtained when thermoplastic bodies of a thickness up to about 30 mm. are divided by the present method, since absolutely smooth separation surfaces having the appearance of being polished are thereby obtained.

The heat required for melting a limited, localized portion of the thermoplastic resin body along the plane at which it is to be divided is created, according to the present invention, by rubbing a rapidly moving thin metal body, such as a strip or the outer edge of a thin disc or ring, with the portion of the thermoplastic body along which the same is to be divided. Thereby frictional heat is formed and the temperature of the metallic friction body and of the thermoplastic resin body in the area of mutual contact is raised to at least the melting temperature of the thermoplastic resin. However, care has to be taken to prevent accumulation of heat in the metallic friction body. The portions of the metallic friction body which are not in contact with the thermoplastic resin body have to be cooled prior to again coming in contact with the thermoplastic body. Depending on the specific operating conditions, contact between the metallic friction body, and especially the parts thereof which have been rubbing against the thermoplastic body, and air surrounding the device, will be sufficient to achieve cooling of the friction body. It is however also within the scope of the present invention to blow cooling air against the portions of the metallic friction body which have previously been heated by being in rubbing contact with the thermoplastic body, or to otherwise cool these portions by any suitable device known in the art.

Preferably, the metallic friction body comprises an endless band of small width made of spring steel, or a spring steel disc or ring. Especially advantageous results are obtained by limiting the width of the edge of the band, disc or ring which comes in rubbing contact with the thermoplastic body. It has been found according to the present invention that best results are obtained by contacting the thermoplastic body with a rubbing metal edge of about between 0.5 and 0.05 mm. width. It has also been found advantageous to so arrange the rapidly moving surface portion of the metallic friction body in relation to the surface of the thermoplastic body along which the same is to be divided that an angle of between 5° and 20° is defined between the surface plane of the thermoplastic body and the moving edge of the metallic friction body. Most preferably this angle is kept between 10° and 15°. The direction of movement of the rubbing edge of the metallic friction body is to be opposite to the direction of movement of the thermoplastic body to be divided. The speed of movement of the rubbing edge of the metallic friction body relative to the thermoplasitc body depends on the specific thermoplastic material used and on the thickness of the thermoplastic body along the plane along which it is to be divided. Preferably the speed of the rapidly moving edge of the metallic friction body is to be kept between about 20 and 40 m./sec.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
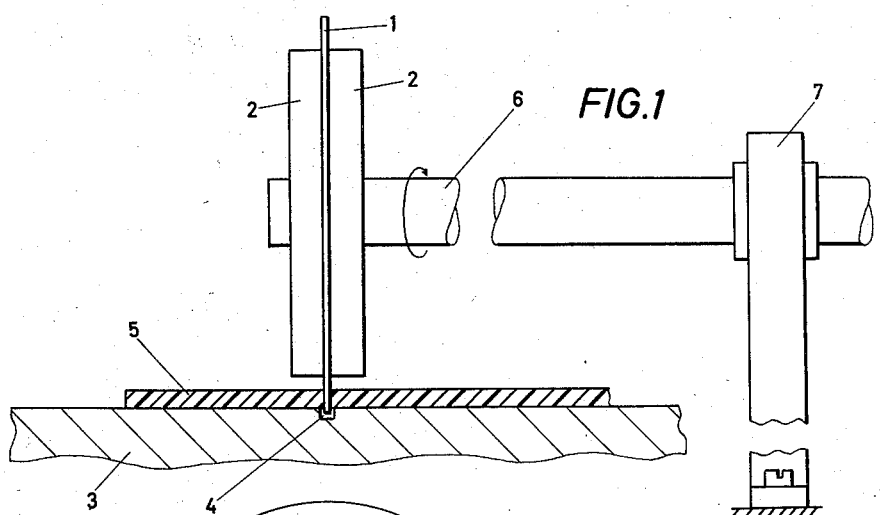
Fig. 1 is a schematic elevated view partially in cross-section of a preferred embodiment of the apparatus of the present invention.
Figure 2:
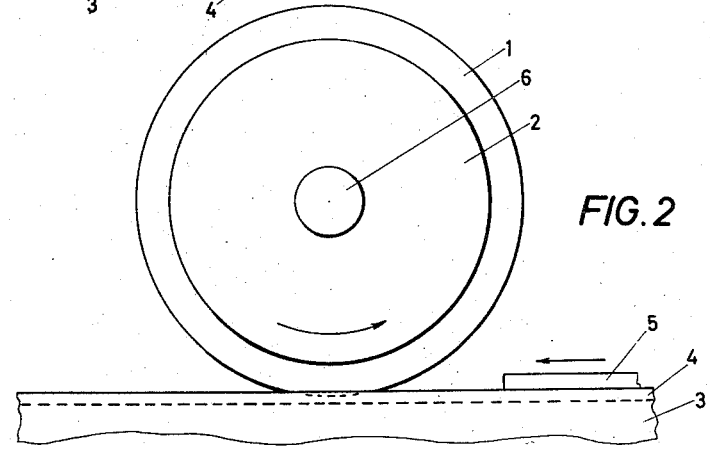
Fig. 2 is a schematic elevated view taken at a right angle to the view shown in Fig. 1.

Referring now to the drawings, and particularly to Figs. 1 and 2, a thin disc 1 made of spring steel is shown supported by two supporting discs 2, and fixedly, rotatably mounted together with supporting discs 2 on shaft 6. Shaft 6 is rotatably mounted on support means 7 which also include rotating means (not shown) for rotating shaft 6 and together with it discs 1 and 2. The diameter of disc 1 is larger than the diameter of discs 2, so that a ring-shaped area of disc 1 extends beyond discs 2. A support 3 is arranged below and parallel to shaft 6 at a distance from the axis of shaft 6 which is slightly less than the length of the radius of disc 1. A slot 4 is cut into the surface of support 3 along the plane of disc 1. Disc 1 extends into slot 4 with the fraction of its radius which exceeds the distance between the axis of shaft 6 and the upper surface of the support 3. Preferably disc 1 extends into slot 4 only for a distance of 1/10 of a millimeter or less. The distance between the outer edge of supporting discs 2 and the upper surface of the support 3 determines the maximum thickness of the thermoplastic resin body which is to be divided. The radius of disc 1 must exceed the length of the radius of discs 2 by at least the thickness of the thermoplastic body to be divided plus the fraction of 1 mm. by which the disc 1 extends into slot 4.

Spring steel disc 1 may for instance have a diameter of 100 mm. and rotate with a speed of 6000 revolutions per minute. The thickness of a sheet of thermoplastic material which is to be divided may then be so chosen that an angle of for instance 13° is formed between the upper surface of the thermoplastic sheet and a tangent taken at the point of contact between the circumference of disc 1 and the upper surface of the thermoplastic sheet. As shown in Fig. 2, disc 1 rotates in a direction opposite to the direction in which thermoplastic sheet 5 is moved towards disc 1. Upon contact between disc 1 moving at 6000 revolutions per minute and thermoplastic sheet 5, frictional heat is created and raises the temperature of the edge portion of disc 1 and of the contacted portion of thermoplastic sheet 5 so that the contacted portion of thermoplastic sheet 5 melts and disc 1 can penetrate further into sheet 5 thereby dividing the same. By this locally limited melting process sheet 5 is divided in such a way as to form completely smooth separation surfaces. Accumulation of heat in disc 1 does not occur due to the thinness (preferably between 0.5 mm. and 0.05 mm.) of spring steel disc 1 and because sufficiently effective air cooling of disc 1 takes place due to the great speed with which disc 1 revolves. The present invention is however not limited to the above described method of operation and it may also be executed with any desired thermoplastic material. The following list of thermoplastic materials of which the bodies to be divided according to the present invention may be formed, is given as illustrative only, the method of the present invention however not being limited to the specific thermoplastic materials listed: mixed acrylate and methacrylate polymerisates, cellulose acetate, cellulose nitrate and other thermoplastic cellulose esters, ethyl cellulose, vinyl resins including polyvinyl chlorides, polystyrene, thermoplastic rubber compounds, polyethylene, polytetrafluoroethylene, polyamide.

Figure 3:
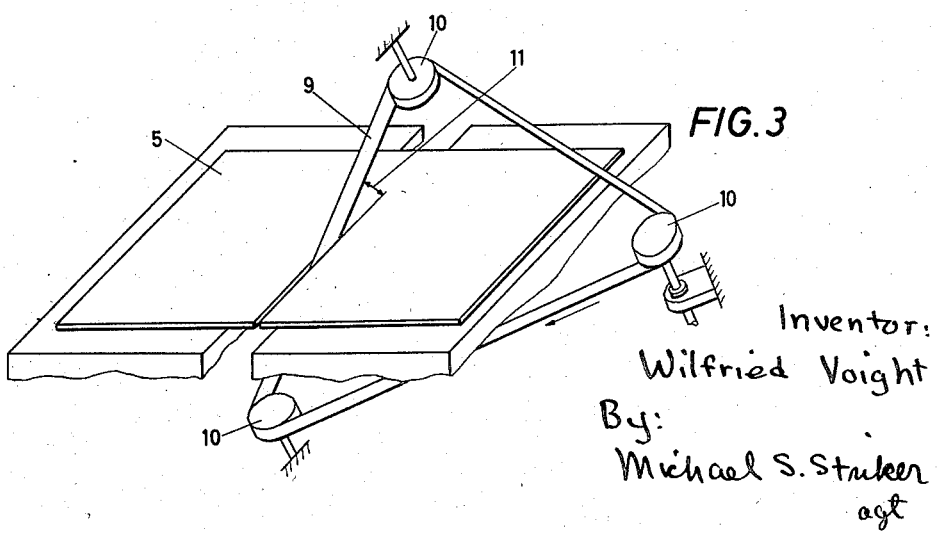
Fig. 3 is a schematic elevated view of another embodiment of the present invention.

Fig. 3 shows a schematic device using an endless steelbelt of rectangular section.

The plastic film or plate 5 is divided by the endless steelbelt 9. The belt is led in the direction of the arrow over the pulleys 10, whereby at least one of them is impelled by a proper device.

By means of a suitable arrangement (not shown) the angle of intersection 11 can be varied as desired. If necessary in order to prevent selfheating of the belt a cooling system can be provided.

The thickness of the belt can be selected according to the requirements within 0.05 to 0.5 mm. as described in the specification.

It will be understood that each of the elements described above, or two or more together, may also find a useful application in other types of dividing devices for thermoplastic materials differing from the types described above.

While the invention has been illustrated and described as embodied in a dividing device for thermoplastic materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of dividing thermoplastic resin bodies, comprising the steps of rapidly moving the edge face of a metal body having throughout the dividing zone thereof a thickness not exceeding the width of said edge face and a thermoplastic resin body at a limited, localized portion thereof relative to and in contact with each other so as to rub said thermoplastic resin body until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

2. A method of dividing thermoplastic resin bodies, comprising the steps of rapidly rubbing the edge face of a metal body having throughout the dividing zone thereof a thickness not exceeding the width of said edge face against a thermoplastic resin body at a limited, localized portion thereof until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

3. A method of dividing thermoplastic resin bodies, comprising the steps of rapidly moving the transversal edge of a metal sheet body having a width of between 0.5 and 0.05 mm. and a thermoplastic resin body at a limited, localized portion thereof relative to and in contact with each other so as to rub said thermoplastic resin body until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

4. A method of dividing thermoplastic resin bodies, comprising the steps of rapidly rubbing the transversal edge of a metal sheet body made of spring steel, said edge having a width of between 0.5 and 0.05 mm. against a thermoplastic resin body at a limited, localized portion thereof until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

5. A method of dividing thermoplastic resin bodies, comprising the steps of rapidly rubbing a thin endless metal band having a width of between about 0.5 and 0.05 mm. against a thermoplastic resin body at a limited, localized portion thereof until said portion of said thermoplastic resin body melts due to the frictional heat caused by said rubbing; and progressively rubbing portions of said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

6. A method of dividing thermoplastic resin bodies, comprising the steps of rapidly rubbing a thin endless metal band made of spring steel and having a width of between 0.5 and 0.05 mm. against a thermoplastic resin body at a limited, localized portion thereof until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

7. A method of dividing thermoplastic resin bodies, comprising the steps of rapidly rubbing the thin outer edge face of a circular metal disc having throughout the dividing zone thereof a thickness not exceeding the width of said edge face and a thermoplastic resin body at a limited, localized portion thereof until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

8. A method of dividing thermoplastic resin bodies, comprising the steps of rapidly rubbing the edge face of a metal body having throughout the dividing zone thereof a thickness not exceeding the width of said edge face against a thermoplastic resin body at a limited, localized portion thereof until said portion of said thermoplastic resin body melts due to the frictional heat caused by said rubbing; moving said thermoplastic resin body forward as it melts in the direction towards said edge of said metal body; and progressively rubbing portions of said thermoplastic resin body next to previously melted portions thereof until the progressively rubbed portions are melted, whereby said thermoplastic resin body may be separated into two parts when the same is melted throughout the thickness and length thereof.

9. A method of dividing thermoplastic resin bodies, comprising the steps of rotating a thin metal disc at a high speed and applying a portion of a thermoplastic resin body to the edge face thereof said metal disc having throughout the dividing zone thereof a thickness not exceeding the width of said edge face, until said portion of said thermoplastic resin body melts due to the frictional heat caused by said rotating edge of said metal disc rotating in contact with said portion; moving said thermoplastic resin body as it melts forward in the direction towards said edge of said metal disc, thereby progressively applying portions of said thermoplastic resin body next to previously melted portions thereof to said edge of said metal disc until said progressively applied portions are melted, whereby said thermoplastic resin body may be separated into two parts when the same is melted throughout the thickness and length thereof.

10. A method of dividing thermoplastic resin bodies, comprising the steps of rotating a thin metal disc at a high speed and applying a portion of a thermoplastic resin body to the edge face thereof said metal disc having throughout the dividing zone thereof a thickness not exceeding the width of said edge face, until said portion of said thermoplastic resin body melts due to the frictional heat caused by said rotating edge of said metal disc rotating in contact with said portion; moving said thermoplastic resin body as it melts forward in the direction towards said edge of said metal disc, said metal disc rotating in a direction opposite to the direction of the forward movement of said thermoplastic resin body, thereby progressively applying portions of said thermoplastic resin body next to previously melted portions thereof to said edge of said metal disc until said progressively applied portions are melted, whereby said thermoplastic resin body may be separated into two parts when the same is melted throughout the thickness and length thereof.

11. A method of dividing thermoplastic resin bodies, comprising the steps of rapidly moving the edge face of a metal body having throughout the dividing zone thereof of a thickness not exceeding the width of said edge face and a thermoplastic resin body at a limited, localized portion thereof relative to and in contact with each other so as to rub said thermoplastic resin body, said thin edge and said portion of said thermoplastic resin body defining an angle of between 5° and 20°, until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

12. A method of dividing thermoplastic resin bodies, comprising the steps of rapidly moving the edge face of a metal body having throughout the dividing zone thereof a thickness not exceeding the width of said edge face and a thermoplastic resin body at a limited, localized portion thereof relative to and in contact with each other so as to rub said thermoplastic resin body, said thin edge and said portion of said thermoplastic resin body defining an angle of between 10° and 15°, until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

13. A method of dividing thermoplastic resin bodies, comprising the steps of rapidly rubbing the edge face of a metal body having throughout the dividing zone thereof a thickness not exceeding the width of said edge face against a thermoplastic resin body at a limited, localized portion thereof the speed of movement of said edge of said metal body being between 20 and 40 meters per second until said portion of said thermoplastic resin body melts due to the frictional heat caused by said rubbing; and progressively rubbing portions of said thermoplastic resin body next to previously melted portions thereof until the progressively rubbed portions are melted, whereby said thermoplastic resin body may be separated into two parts when the same is melted throughout the thickness and length thereof.

14. A method according to claim 1 in which portions of said edge face of said metal body are alternatingly in contact and out of contact with said thermoplastic resin body and including the step of cooling portions of said thin edge of said metal body while said portions are out of contact with said thermoplastic resin body.

15. In a device of the type described, in combination, support means; a shaft rotatably mounted on said support means; a thin disc of predetermined diameter and having an edge face fixedly centrally mounted on said shaft and extending perpendicularly to the axis thereof so as to rotate with the same; supporting discs fixedly mounted on said shaft on opposite sides of said thin disc and supporting the same, said supporting discs having diameters smaller than said predetermined diameter of said thin disc, and said thin disc having throughout substantially the entire portion thereof extending outwardly of said supporting discs a thickness not exceeding the width of said edge face; a support arranged parallel to said shaft and at a distance from the axis thereof slightly smaller than the radius of said thin disc, said support being formed with a notch in which the circular edge of said thin disc is adapted to rotate.

References Cited in the file of this patent

UNITED STATES PATENTS

| | | |
|---|---|---|
| 2,169,315 | Yngve | Aug. 15, 1939 |
| 2,380,363 | Land et al. | July 10, 1945 |